United States Patent
Wu et al.

(10) Patent No.: US 7,061,555 B2
(45) Date of Patent: Jun. 13, 2006

(54) PIXEL STRUCTURE OF DUAL MODE LIQUID CRYSTAL DISPLAY

(75) Inventors: Ivan Yang-En Wu, Taipei (TW); Jian-Shen Yu, Hsinchu (TW); Fu-Jen Ko, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 94 days.

(21) Appl. No.: 10/707,664

(22) Filed: Dec. 31, 2003

(65) Prior Publication Data

US 2004/0125271 A1 Jul. 1, 2004

(30) Foreign Application Priority Data

Dec. 31, 2002 (TW) ................................ 91137972 A

(51) Int. Cl.
*G02F 1/136* (2006.01)
*G02F 1/1335* (2006.01)
*H01J 1/62* (2006.01)
*G09G 3/32* (2006.01)

(52) U.S. Cl. ........................... 349/48; 349/43; 349/69; 349/113; 313/500; 313/505; 345/82

(58) Field of Classification Search ................. 349/43, 349/48, 69, 96, 113, 117; 313/500, 505; 345/78, 82, 84

See application file for complete search history.

(56) References Cited

U.S. PATENT DOCUMENTS

| | | | |
|---|---|---|---|
| 6,351,078 B1* | 2/2002 | Wang et al. | 315/169.3 |
| 6,462,469 B1* | 10/2002 | Young | 313/504 |
| 6,556,260 B1* | 4/2003 | Itou et al. | 349/69 |
| 6,714,268 B1* | 3/2004 | Wang et al. | 349/48 |
| 6,756,641 B1* | 6/2004 | Lu | 257/350 |
| 2002/0149320 A1* | 10/2002 | Maruyama et al. | 315/169.3 |
| 2003/0016196 A1* | 1/2003 | Lueder et al. | 345/82 |
| 2004/0070711 A1* | 4/2004 | Wen et al. | 349/114 |

* cited by examiner

*Primary Examiner*—Tarifur R. Chowdhury
(74) *Attorney, Agent, or Firm*—Jiang Chyun IP Office

(57) ABSTRACT

A dual mode liquid crystal display device comprising an upper substrate, a lower substrate and a liquid crystal layer between the upper and the lower substrate is provided. The lower substrate further includes a first thin film transistor, a second thin film transistor, a reflective electrode connected to the first thin film transistor, and a regional light-emitting source connected to the second thin film transistor. The first thin film transistor and its electrically connected reflective electrode and the second thin film transistor and its electrically connected light-emitting diode can be positioned inside two separate pixel regions or inside a single pixel region.

18 Claims, 4 Drawing Sheets

PIXEL STRUCTURE OF DUAL MODE LIQUID CRYSTAL DISPLAY

CROSS REFERENCE TO RELATED APPLICATIONS

This application claims the priority benefit of Taiwan application Ser. No. 91137972, filed Dec. 31, 2002.

BACKGROUND OF INVENTION

1. Field of Invention

The present invention relates to a mixed light source display. More particularly, the present invention relates to a dual mode liquid crystal display (LCD) that integrates a liquid crystal display device and a light-emitting diode (LED) display device together.

2. Description of Related Art

In recent years, reflective liquid crystal display that utilizes incoming light as a light source is widely popular because there is no need to provide back light. Without the need to generate back light, power consumption is low and the display panel can be slimmer and lighter.

A conventional reflective liquid crystal display device includes an upper substrate, a polarizer plate and a quarter wave plate over the upper substrate, a lower substrate, a reflective layer over the lower substrate and a liquid crystal layer between the upper and the lower substrate. Since external light source is used as a source of illumination, power consumption is typically low. However, one major defect is that the display has some difficulties in displaying dark background area.

On the other hand, a conventional light-emitting diode display device has an upper and a lower glass substrate. To eliminate as much reflection between various interfaces as possible and increase image contrast, a quarter wave plate and a polarizer plate are still attached to the upper glass substrate. In other words, the basic structure and the polarizer plate structure of the light-emitting diode display device is very similar to the reflective liquid crystal display device. Although most light-emitting diode display device consumes roughly ten times the electrical power of a reflective liquid crystal display device, one major advantages is that the light-emitting diode display device is unaffected by background light intensity.

SUMMARY OF INVENTION

Accordingly, one objective of the present invention is to provide a dual mode liquid crystal display device that integrates a reflective liquid crystal display device and a light-emitting diode display device together such that the reflective liquid crystal display device can be used to save power when background light intensity is strong and the light-emitting diode display device can be used to boost light intensity level and contrast when background light intensity is weak. With this arrangement, the dual mode display is able to lower power consumption and yet able to boost up image contrast when background light is weak.

Another objective of this invention is to provide a dual mode liquid crystal display device that utilizes the structural similarity between a reflective liquid crystal display device and a light-emitting diode display device to combine the two together.

To achieve these and other advantages and in accordance with the purpose of the invention, as embodied and broadly described herein, the invention provides a dual mode liquid crystal display device that integrates a reflective liquid crystal display device and a light-emitting diode display device together. The dual mode display device includes an upper substrate, a lower substrate and a liquid crystal layer between the upper and the lower substrate. The lower substrate further includes a first thin film transistor, a second thin film transistor, a reflective electrode connected to the first thin film transistor, and a regional light-emitting source connected to the second thin film transistor. In a preferred embodiment, the first thin film transistor and the reflective electrode are formed in a first pixel region, and the second thin film transistor and the regional light-emitting source are formed in a second pixel region. In another preferred embodiment, the first thin film transistor, the reflective electrode, the second thin film transistor and the regional light-emitting source are formed in a pixel region.

This invention also provides a third dual mode liquid crystal display device that integrates a reflective liquid crystal display device and a light-emitting diode display device together. The dual mode display device includes an upper substrate, a lower substrate and a liquid crystal layer between the upper and the lower substrate. The upper substrate further comprising a first thin film transistor and a first transparent electrode electrical connected to the first thin film transistor, a second thin film transistor and a regional light-emitting source electrical connected with the second thin film transistor. The lower substrate includes a bumpy layer on a substrate, a reflective layer on the bumpy layer, a color-filtering array on the reflective layer, and a second transparent electrode on the color-filtering array.

This invention also provides a third dual mode liquid crystal display device that integrates a reflective liquid crystal display device and a light-emitting diode display device together. The dual mode display device includes an upper substrate, a lower substrate and a liquid crystal layer between the upper and the lower substrate. The upper substrate comprising a first transparent electrode and a regional light-emitting source electrical connected to the first transparent electrode. The lower substrate comprising a second electrode.

In this invention, a reflective liquid crystal display device and a light-emitting diode display device are combined together into a dual mode liquid crystal display device. Hence, the reflective liquid crystal display device can be used to save power when the background light intensity is strong and the light-emitting diode can be triggered to boost contrast when the background light intensity is weak.

Through the integration of a reflective liquid crystal display device and a light-emitting diode display device to form a dual mode display device, the reflective liquid crystal display device can be used alone to save power when the background light intensity is strong. The light-emitting diode display device serves as a compensatory device that triggers to produce light only when the reflective liquid crystal display device receives insufficient background lighting.

Since the light-emitting diode display device and the reflective liquid crystal display device have very similar structure, the fabrication of dual mode liquid crystal display device is very much simplified.

Furthermore, the dual mode liquid crystal display device no longer requires the front light source of a conventional reflective liquid crystal display or the back light source of a semi-transparent reflective liquid crystal display and provides improved optical properties.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1:
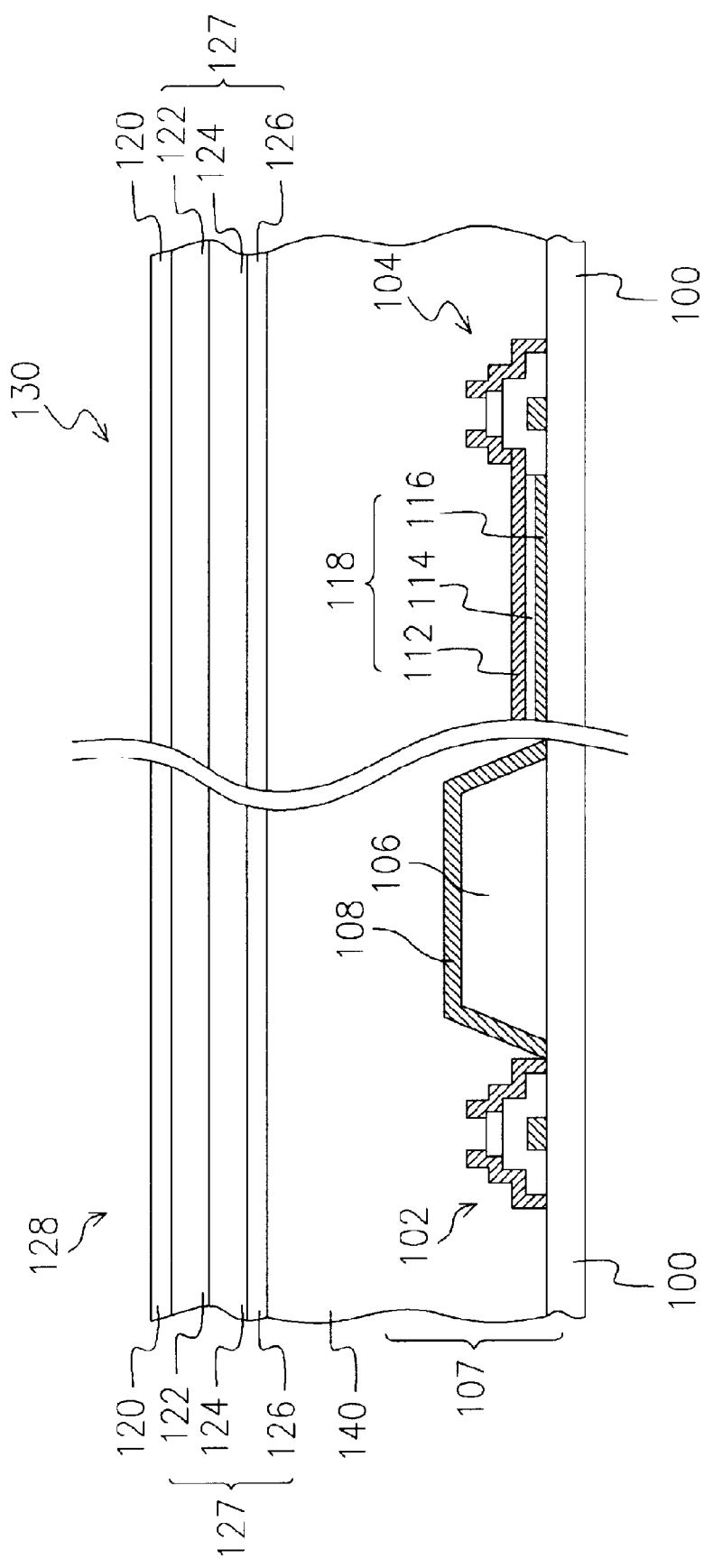
FIG. 1 is a schematic cross-sectional view of a dual mode liquid crystal display device according to a first preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic cross-sectional view of a dual mode liquid crystal display device according to a first preferred embodiment of this invention. As shown in FIG. 1, the dual mode liquid crystal display device includes an upper substrate 127, a lower substrate 107 and a liquid crystal layer 140 between the upper substrate 127 and the lower substrate 107.

The upper substrate 127 further includes a substrate 122, a color-filtering array 124 on the lower surface of the substrate 122 and a first transparent electrode 126 on the lower surface of the color-filtering array 124. The upper surface of the substrate 122 further includes a polarizer plate 120 and a quarter wave plate (not shown) for displaying when light passes through the plates.

The lower substrate 107 further includes a substrate 100, a thin film transistor array on the substrate 100, a reflective electrode 108 on the substrate 100 and a regional light source including, for example, a light-emitting diode 118. The thin film transistor array includes a first thin film transistor 102 and a second thin film transistor 104 electrically connected to the reflective electrode 108 and the light-emitting diode 118 respectively.

The reflective electrode 108 covers a bumpy layer 106. The reflective electrode 108 is fabricated using, for example, a metallic material so that incoming light is reflected out from the display device. In the meantime, an electric field is also set up between the reflective electrode 108 and the first transparent electrode 126 over the upper substrate 127 so that the liquid molecules inside the crystal layer 140 between the upper electrode 127 and the lower electrode 107 can be twisted.

The light-emitting diode 118 on the substrate 100 includes a cathode 116 made from a metallic material having good electrical conductivity including, for example, silver or aluminum. A light-emitting layer 114 is on the cathode 116. The light-emitting layer 114 is fabricated using light-emitting material including, for example, an organic or an inorganic substance. A second transparent electrode 112 is also formed over the light-emitting layer 114. The second transparent electrode 112 is electrically connected to the second thin film transistor 104 and fabricated using a material including, for example, indium-tin-oxide to serve as an anode for the light-emitting diode 118.

The first thin film transistor 102, the reflective electrode 108 over the bumpy layer 106, the liquid crystal layer 140 and the upper substrate 127 over the reflective electrode 108 together constitute a reflective liquid crystal display device 128. The second thin film transistor 104, the light-emitting diode 118 and the upper substrate 127 over the light-emitting diode 118 together constitute a light-emitting diode liquid crystal display device 130.

In this embodiment, the first thin film transistor 102 and its electrically connected reflective electrode 108 and the second thin film transistor 104 and its electrically connected light-emitting diode 118 can be positioned inside two separate pixel regions or inside a single pixel region. In other words, in one preferred embodiment, the first thin film transistor 102 and its electrically connected reflective electrode 108 are formed in a first pixel region, and the second thin film transistor 104 and its electrically connected light-emitting diode 118 are formed in a second pixel region. In another embodiment, the first thin film transistor 102, the reflective electrode 108 electrically connected to the first thin film transistor 102, the second thin film transistor 104 and light-emitting diode 118 electrically connected to the second thin film transistor 104 are all farmed in the one pixel region. In addition, two or more thin film transistors may be used to drive the light-emitting diode 118 all according to the design requirement.

When the background light intensity is strong, the dual mode liquid crystal display device of this invention uses the reflective liquid crystal display device 128 as the principal display device to save power. On the other hand, when the background light intensity is weak, the light-emitting diode 118 is driven to produce light so that the light-emitting liquid crystal display device 130 cuts in to serves as the principal display device, thereby improving the display capacity.

Figure 2:
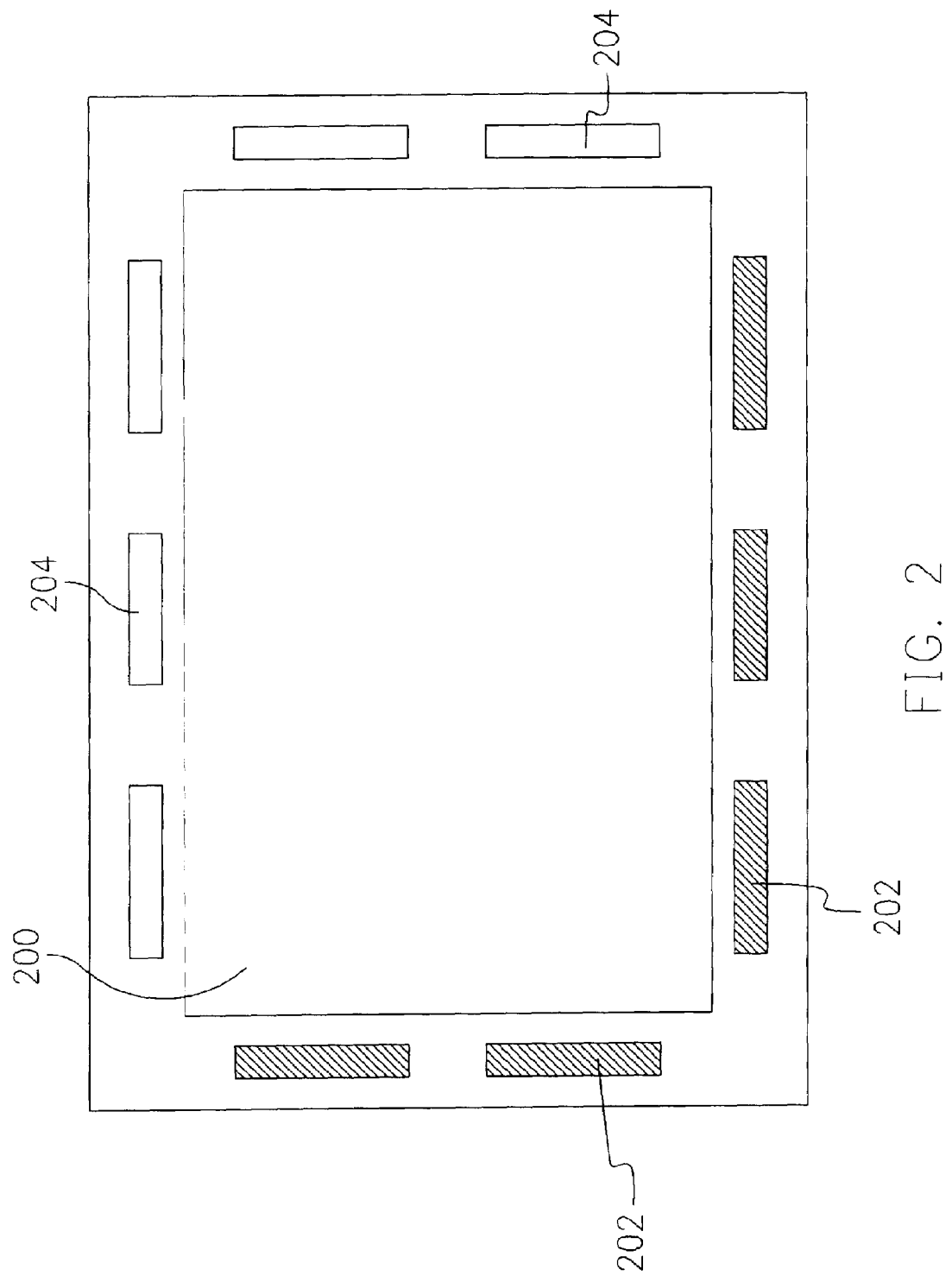
FIG. 2 is a top view showing the positions of the drivers for the dual mode liquid crystal display device according to the first preferred embodiment of this invention.

FIG. 2 is a top view showing the positions of the drivers for the dual mode liquid crystal display device according to the first preferred embodiment of this invention. As shown in FIG. 2, the drivers are distributed around the periphery of the display panel 200. For example, the drivers 202 are used for driving the reflective liquid crystal display devices and the drivers 204 are used for driving the light-emitting diode liquid crystal display devices. However, the driver 202 for driving the reflective liquid crystal display device may combine with the driver 204 for driving the light-emitting diode liquid crystal display device all according to actual design requirement.

Figure 3:
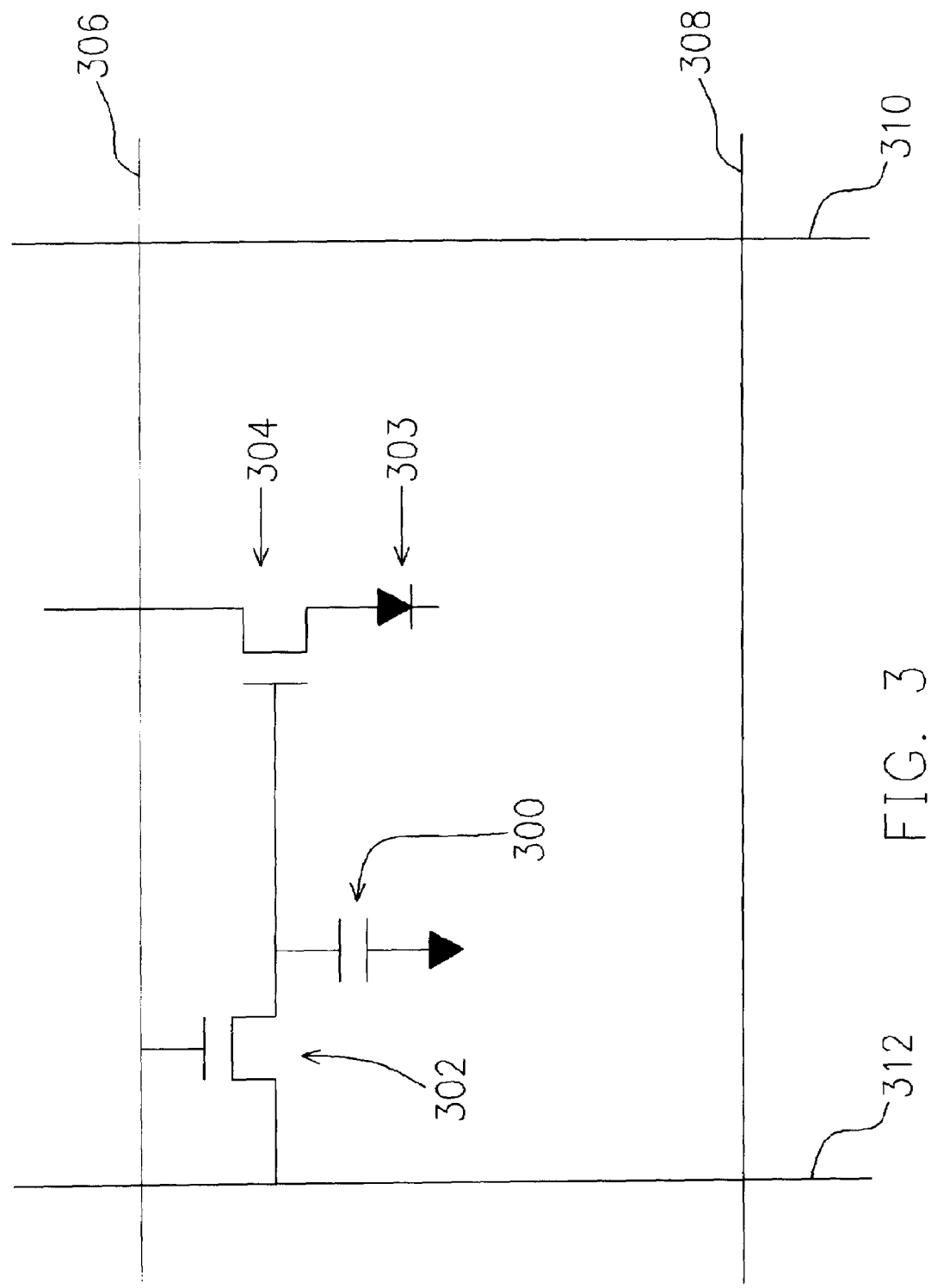
FIG. 3 is an equivalent circuit diagram of the dual mode liquid crystal display device according to the first preferred embodiment of this invention.

FIG. 3 is an equivalent circuit diagram of the dual mode liquid crystal display device according to the first preferred embodiment of this invention. As shown in FIG. 3, a first thin film transistor 302 having a gate, a drain and a source is formed between the scan lines 306, 308 and the data lines 310, 312. The gate of the first thin film transistor 302 is electrically connected to the scan line 306 and the source of the first thin film transistor 302 is electrically connected to the data line 312. The drain of the first thin film transistor 302 is electrically connected to the gate of a second thin film transistor 304 and a liquid crystal capacitor 300. The source of the second thin film transistor is electrically connected to a light-emitting diode 303.

Figure 4:
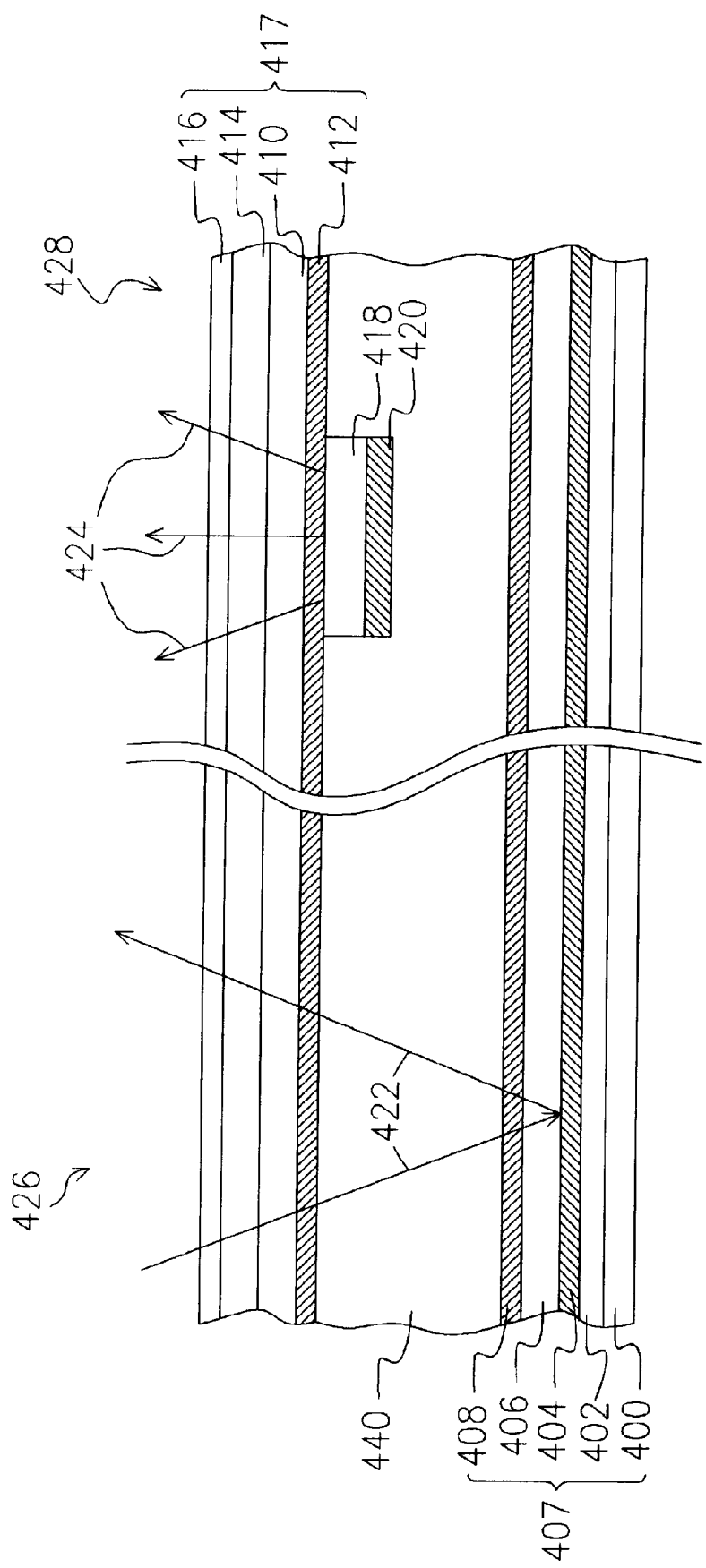
FIG. 4 is a schematic cross-sectional view of a dual mode liquid crystal display device according to a second preferred embodiment of this invention.

FIG. 4 is a schematic cross-sectional view of a dual mode liquid crystal display device according to a second preferred embodiment of this invention. As shown in FIG. 4, the dual mode liquid crystal display device of this invention includes a lower substrate 407, an upper substrate 417 and a liquid crystal layer 440 between the upper substrate 417 and the lower substrate 407.

The lower substrate 407 further includes a substrate 400, a bumpy layer 402 over the substrate 400, a reflective layer 404 over the bumpy layer 402, a color-filtering array 406 over the reflective layer 404 and a second transparent layer 408 over the color-filtering array 406. The reflective layer 404 is a metallic layer, for example. The bumpy layer 402 has a rough surface for roughening the surface of the overlying reflective layer 404 so that any incoming light 422 is scattered evenly out of the display device.

The upper substrate 417 further includes a substrate 410, a first transparent electrode 412 on the lower surface of the substrate 410 and a quarter wave plate 414 on the upper surface of the substrate 410. The first transparent electrode 412 is, for example, an indium-tin-oxide layer. The upper surface of the upper substrate 417 may further include a polarizer plate 416 and a quarter wave plate (not shown) so that light passing through the plates can have depth variation.

If the liquid crystal display device according to this embodiment is a passive type of display, the first electrode 412 and the second electrode 408 are in form of long strips with their direction of extension perpendicular to each other.

However, if the liquid crystal display device is an active liquid crystal display, at the first electrode 412 further comprising a first thin film transistor, a second thin film transistor and a pixel electrode. The first thin film transistor is electrically connected to the pixel electrode and the second thin film transistor is electrically connected to the subsequently fabricated regional light-emitting device. In addition, the second electrode 408 is a non-patterned electrode film.

A light-emitting layer 418 is formed over a portion of the first transparent electrode 412 on the upper substrate 417 and a cathode 420 is formed over the light-emitting layer 418. Hence, a portion of the first transparent electrode 412, the light-emitting layer 418 and the cathode 420 together constitute a light-emitting diode. Only a portion of the first transparent electrode 412 is used as an anode of the light-emitting diode. With this arrangement, the light-emitting diode and the overhead upper substrate 417 together form a light-emitting diode display device 428 while the remaining upper substrate 417, the lower substrate 407 and the liquid crystal layer 440 together form a reflective liquid crystal display device 426.

When the background light intensity is strong, the dual mode liquid crystal display device uses the reflective liquid crystal display device 426 as the principal display. A beam of incoming light 422 is reflected on encountering the reflective layer 404 on the lower substrate 407. The reflected light 422 passes through the color-filtering array 406, the liquid crystal layer with liquid crystal molecules twisted according to size of electric field between the electrodes to emerge with the desired color and depth, thereby saving power. On the other hand, when the background light intensity is weak, the light-emitting diode device 428 serves as the principal display device. The cathode 420 of the light-emitting diode is triggered so that the light-emitting layer 418 emits light 424. Additionally, the color-filtering array 406 on the lower substrate 407 may also be fabricated on the upper surface of the substrate 410 of the upper substrate 417.

In the embodiment of this invention, a light-emitting diode is used as the light source for the display device. However, other light sources may also be combined with the reflective liquid crystal display device to form the dual mode liquid crystal display device.

In summary, major advantages of this invention includes: 1. In this invention, a reflective liquid crystal display device and a light-emitting diode display device are combined together into a dual mode liquid crystal display device. Hence, the reflective liquid crystal display device can be used to save power when the background light intensity is strong and the light-emitting diode can be triggered to boost contrast when the background light intensity is weak. 2. Through the integration of a reflective liquid crystal display device and a light-emitting diode display device to form a dual mode display device, the reflective liquid crystal display device can be used alone to save power when the background light intensity is strong. The light-emitting diode display device serves as a compensatory device that triggers to produce light only when the reflective liquid crystal display device receives insufficient background lighting. 3. Because the light-emitting diode display device and the reflective liquid crystal display device have very similar structure, the fabrication of dual mode liquid crystal display device is very much simplified. 4. The dual mode liquid crystal display device no longer requires the front light source of a conventional reflective liquid crystal display or the back light source of a semi-transparent reflective liquid crystal display and provides improved optical properties.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

The invention claimed is:

1. A dual mode liquid crystal display device, comprising:
an upper substrate;
a lower substrate comprising a first thin film transistor, a second thin film transistor, a reflective electrode connected to the first thin film transistor, and a regional light-emitting source with a reflective cathode being electrically connected to the second thin film transistor; and
a liquid crystal layer between the upper substrate and the lower substrate.

2. The display device of claim 1, wherein the upper substrate further includes:
a substrate;
a color-filtering array on one surface of the substrate; and
a first transparent electrode on the surface of the color-filtering layer.

3. The display device of claim 2, wherein the device further includes a polarizer plate and a quarter wave plate on a substrate surface just opposite the color-filtering array.

4. The display device of claim 1, wherein the regional light-emitting source includes a light-emitting diode.

5. The display device of claim 4, wherein the light-emitting diode further includes:
the reflective cathode on the lower substrate;
a light-emitting layer on the cathode; and a second transparent electrode on the light-emitting layer, wherein the second transparent electrode serves as an anode.

6. The display device of claim 1, wherein the reflective electrodes is set up on a bumpy layer.

7. The display device of claim 1, wherein the first thin film transistor and the reflective electrode are formed in a first pixel region, and the second thin film transistor and the regional light-emitting source are formed in a second pixel region.

8. The display device of claim 1, wherein the first thin film transistor, the reflective electrode, the second thin film transistor and the regional light-emitting source are formed in a pixel region.

9. A dual mode liquid crystal display device, comprising:
an upper substrate having a first thin film transistor and a first transparent electrode electrical connected to the first thin film transistor, a second thin film transistor and a regional light-emitting source electrically connected with the second thin film transistor;
a lower substrate having a bumpy layer thereon, a reflective layer on the bumpy layer, a color-filtering array on the reflective layer and a second transparent electrode on the color-filtering array;
a liquid crystal layer between the upper substrate and the lower substrate.

10. The display device of claim 9, wherein the regional light-emitting source includes a light-emitting diode.

11. The display device of claim 10, wherein a portion of the first transparent electrode serves as an anode for the light-emitting diode and the light-emitting diode further includes:
a light-emitting layer on a surface of the first transparent electrode facing the lower substrate; and
a cathode on the light-emitting layer facing the lower substrate.

12. The display device of claim 11, wherein aside from the first transparent electrode and the first/second thin film transistor on the substrate of the upper substrate, further includes:
a quarter wave plate on one surface of the substrate; and
a polarizer plate on the quarter wave plate.

13. The display device of claim 9, wherein the reflective liquid crystal display device serves as the principal display device when the background light intensity is strong and the regional light-emitting source serves as the principal display device when the background light intensity is weak.

14. A dual mode liquid crystal display device, comprising:
an upper substrate having a first transparent electrode and a regional light-emitting source electrically connected to the first transparent electrode;
a lower substrate having a second transparent electrode thereon, wherein between the lower substrate and the second transparent electrode there is a bumpy layer on the surface of the lower substrate, a reflective layer on the bumpy layer and a color-filtering array on the reflective layer; and a liquid crystal layer between the upper substrate and the lower substrate.

15. The display device of claim 14, wherein the regional light-emitting source includes a light-emitting diode.

16. The display device of claim 15, wherein a portion of the first transparent electrode serve as an anode for the light-emitting diode and the light-emitting diode further includes:
a light-emitting layer on a surface of the first transparent electrode facing the lower substrate; and
a cathode on the light-emitting layer facing the lower substrate.

17. The display device of claim 14, wherein aside from the first transparent electrode on a substrate of the upper substrate, further includes:
a quarter wave plate on one surface of the substrate; and
a polarizer plate on the quarter wave plate.

18. The display device of claim 14, wherein the reflective liquid crystal display device serves as the principal display device when the background light intensity is strong and the regional light-emitting source serves as the principal display device when the background light intensity is weak.

* * * * *